United States Patent
Maria

(10) Patent No.: US 10,972,447 B2
(45) Date of Patent: *Apr. 6, 2021

(54) SHORT MESSAGE SERVICE GATEWAY FOR MEDIA STREAMING SECURITY

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,677

(22) Filed: Aug. 12, 2019

(65) Prior Publication Data

US 2019/0364429 A1 Nov. 28, 2019

Related U.S. Application Data

(63) Continuation of application No. 15/259,575, filed on Sep. 8, 2016, now Pat. No. 10,382,956.

(51) Int. Cl.
| | |
|---|---|
| *G06F 21/00* | (2013.01) |
| *H04L 29/06* | (2006.01) |
| *H04W 4/12* | (2009.01) |
| *H04W 4/14* | (2009.01) |
| *H04W 12/04* | (2021.01) |
| *H04W 12/06* | (2021.01) |

(52) U.S. Cl.
CPC ............ *H04L 63/062* (2013.01); *H04L 63/18* (2013.01); *H04L 65/1063* (2013.01); *H04L 65/1073* (2013.01); *H04L 65/80* (2013.01); *H04W 4/12* (2013.01); *H04W 4/14* (2013.01); *H04W 12/0401* (2019.01); *H04W 12/0609* (2019.01)

(58) Field of Classification Search
CPC ..... H04W 88/16; H04W 80/04; H04W 12/06; H04W 88/005; H04W 92/14
See application file for complete search history.

(56) References Cited

U.S. PATENT DOCUMENTS

| | | | |
|---|---|---|---|
| 8,041,335 B2 * | 10/2011 | Khetawat | H04W 12/08 455/404.2 |
| 8,234,410 B2 | 7/2012 | Alexander et al. | |
| 8,763,097 B2 | 6/2014 | Bhatnagar et al. | |
| 9,020,528 B2 | 4/2015 | Hurowitz et al. | |
| 2010/0232340 A1 | 9/2010 | Godor et al. | |

(Continued)

FOREIGN PATENT DOCUMENTS

| | | |
|---|---|---|
| CN | 202026331 | 11/2011 |
| KR | 20120068352 | 6/2012 |

*Primary Examiner* — Ghazal B Shehni

(57) ABSTRACT

A processor may receive a request to authenticate an endpoint device associated with a media streaming session, the media streaming session delivered to the endpoint device via a cellular access network, generate an authentication key, and transmit the authentication key to the endpoint device via a short message service message. The processor may further receive a calculated response from the endpoint device, the calculated response based upon the authentication key and a seed key of the endpoint device, determine whether the calculated response matches an expected response based upon the authentication key and the seed key, and authenticate the endpoint device based upon whether the calculated response matches the expected response.

20 Claims, 3 Drawing Sheets

(56) References Cited

U.S. PATENT DOCUMENTS

| | | |
|---|---|---|
| 2012/0246668 A1 | 9/2012 | Pan |
| 2012/0278856 A1 | 11/2012 | Zeng et al. |
| 2012/0314574 A1 | 12/2012 | Shaheen |
| 2014/0115676 A1* | 4/2014 | Coghlan ........... H04W 12/0609 726/6 |
| 2016/0219045 A1* | 7/2016 | Toedter ................ H04L 9/3271 |

* cited by examiner

SHORT MESSAGE SERVICE GATEWAY FOR MEDIA STREAMING SECURITY

This application is a continuation of U.S. patent application Ser. No. 15/259,575, filed Sep. 8, 2016, now U.S. Pat. No. 10,382,956, which is herein incorporated by reference in its entirety.

The present disclosure relates generally to securing network-based media streaming sessions, and more particularly to devices, computer-readable media, and methods for authenticating endpoint devices associated with media streaming sessions via short message service (SMS) messages.

BACKGROUND

Media streaming services may interface with mobile applications, or clients residing on users' smartphone devices. For example, music may be streamed from servers of a music streaming service to a mobile application of a smartphone device using a multicasting protocol. A similar architecture may be used where video is streamed to mobile application clients from servers of a video streaming service. A telecommunications service provider network acts as a pass-through data service which simply transmits and receives Internet Protocol (IP) packets to facilitate media streaming.

SUMMARY

In one example, the present disclosure discloses a device, computer-readable medium, and method for authenticating an endpoint device associated with a media streaming session. For example, a processor may receive a request to authenticate an endpoint device associated with a media streaming session, the media streaming session delivered to the endpoint device via a cellular access network, generate an authentication key, and transmit the authentication key to the endpoint device via a short message service message. The processor may further receive a calculated response from the endpoint device, the calculated response based upon the authentication key and a seed key of the endpoint device, determine whether the calculated response matches an expected response based upon the authentication key and the seed key, and authenticate the endpoint device based upon whether the calculated response matches the expected response.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
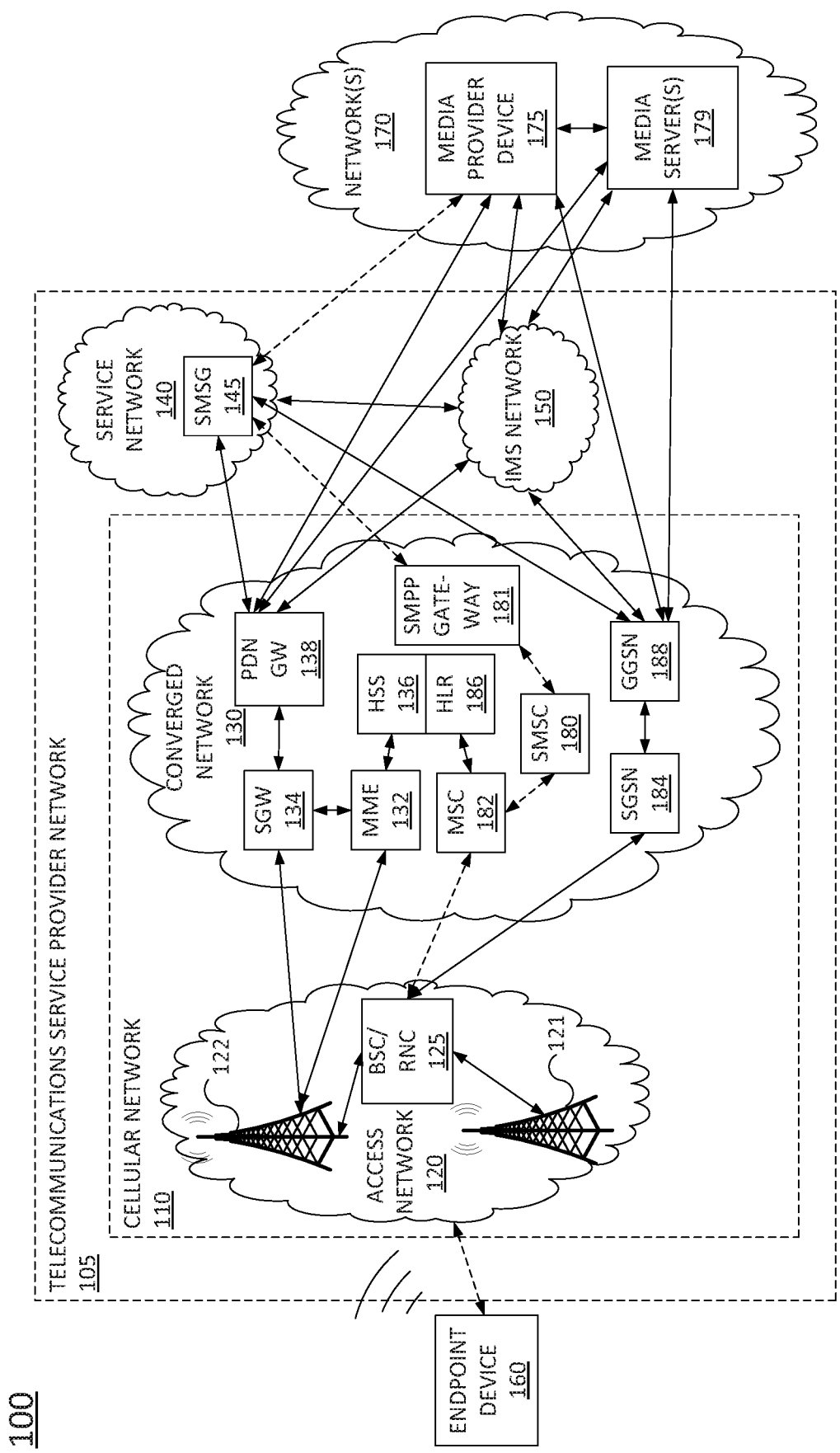
FIG. 1 illustrates an example system related to the present disclosure.

The present disclosure broadly discloses devices, computer-readable media, and methods for authenticating an endpoint device associated with a media streaming session, e.g., within a cellular network. In particular, in one example, the present disclosure provides out-of-band command and control communications for media streaming services used by endpoint devices. For instance, a media streaming service may interface with a mobile application, or client residing on a user's endpoint device. Media or media content may be streamed from one or more servers of the media streaming service to the mobile application of the endpoint device via a telecommunications service provider network, e.g., in the form of IP packets in a stream or flow. In addition, in accordance with the present disclosure, media streaming services may issue commands to endpoint devices using SMS messages, and may solicit responses from the endpoint devices, which may also be transmitted via SMS messages. Accordingly, a streaming media service is able to provide primary and/or secondary endpoint device authentication, security services, outage notification, encryption key verification and other services that would be considered out-of-band, e.g., with respect to the IP-based communications that may be used for media streaming sessions.

In the absence of the present disclosure, a telecommunications service provider network acts as a pass-through data service which simply transmits and receives IP packets to facilitate media streaming. In the case of media streaming to an endpoint device via a cellular network, IP packets of a media streaming session may be conveyed via a Universal Mobile Telecommunications System (UMTS) terrestrial radio access network (UTRAN) portion or via an evolved UTRAN (eUTRAN) portion of the cellular network. If the UTRAN or eUTRAN is not available, the media streaming services may not be able to download and/or stream media/content to the endpoint device. Furthermore, depending on the nature of the outage or poor service, the endpoint device may be unable to contact the media streaming service. This may be the case even though in poor coverage areas the endpoint device may still send and receive SMS messages. For instance, in one example, SMS messages do not use the data network (e.g., a UTRAN or an eUTRAN of a $3^{rd}$ Generation (3G) or a $4^{th}$ Generation (4G) portion of the cellular network). Instead, SMS messages may be conveyed via a dedicated control channel (DCCH) of a base station subsystem (BSS), e.g., a Global System for Mobile communication (GSM) radio access network (GRAN). For instance, the BSS may comprise a $2^{nd}$ Generation (2G) portion of the cellular network. Thus, in accordance with the present disclosure, control messages for a media streaming session may be sent via SMS messages even if the data network is not available. In other words, SMS messages may be used for out-of-band communication of control messages for media streaming sessions.

In one example, the present disclosure includes a device or server, which may be referred to as a "streaming media SMS gateway" (SMSG) to facilitate SMS messaging for control communications of a media streaming session. In one example, the streaming media SMS gateway may interface with devices of media streaming services, e.g., via IP-based communications. In one example, the streaming media SMS gateway may also interface with SMS components of the cellular network, e.g., a short message service center (SMSC) and/or an SMS peering protocol (SMPP) gateway. For instance, the streaming media SMS gateway may interface with the SMSC and SMPP gateway using the SMPP protocol. In one example, the streaming media SMS gateway may also interface with other cellular network elements via the Signaling System 7 (SS7) protocol. For instance, the streaming media SMS gateway may include a SS7 front-end processor comprising dedicated hardware or network function virtualization infrastructure (NFVI).

In accordance with the present disclosure, the streaming media SMS gateway may perform security services relating to a media streaming session, including endpoint device authentication, retransmission of authentication keys, transferring or redirecting the session to a different source server, downgrading or upgrading a quality of the media conveyed via the session, terminating the session, sending a notification to the endpoint device of a problem at the media streaming service end of the session, receiving a notification from the endpoint device of a problem with the endpoint device end of the session, and so forth.

To illustrate, endpoint device authentication may include the streaming media SMS gateway receiving an authentication request from a device of a media provider. In one example, the streaming media SMS gateway may generate an authentication key, e.g., a randomly generated number, or the like, and may include the authentication key in an SMS message that includes an instruction to the endpoint device, or the mobile application of the endpoint device, to generate a calculated response based upon the authentication key and based upon a seed key of the endpoint device. For example, the seed key may be provided to the endpoint device at a time during which the endpoint device initially downloads or installs a mobile application/client of the media streaming service. In one example, the seed key uniquely identifies the endpoint device and/or the version of the mobile application that is installed on the endpoint device. In one example, the authentication key and/or the entire SMS message including the instruction may be encrypted, e.g., using the Advanced Encryption Standard (AES) algorithm, or a similar encryption format.

In one example, the endpoint device may generate the calculated response based upon both the authentication key and the seed key using any number of operations. The endpoint device may then convey the calculated response in an SMS message back to the streaming media SMS gateway. The calculated response and or the SMS message from the endpoint device may be similarly encrypted. In one example, the streaming media SMS gateway may compare the calculated response with an expected response. For instance, the streaming media SMS gateway may store or may have access to another device storing seed keys for various endpoint devices and/or for various media streaming services. Therefore, the streaming media SMS gateway may generate the expected response using the seed key and the authentication key in the same way as the endpoint device generates the calculated response. If the calculated response and the expected response match, then the mobile application and/or the endpoint device may be authenticated, e.g., validated as being authorized to receive media via the streaming media session.

In one example, the streaming media SMS gateway may convey notifications of service problems between the endpoint device and the media provider. For example, the endpoint device may send an SMS message to the streaming media SMS gateway indicating an outage, poor performance, etc. The streaming media SMS gateway may then translate the SMS message into one or more IP packets and convey to the media provider. Similarly, the media provider may detect a problem at the media provider end and may send an alert to the streaming media SMS gateway, which may be formatted into an SMS message and conveyed to the endpoint device. For instance, the SMS message could cause the mobile application to simply present a notification via a display or speaker of the endpoint device that the media streaming service is not currently available, or provide a time estimate for restoration or other relevant information to the user. In one example, the SMS messages may be multicast, e.g., if there are multiple endpoint devices that are receiving a media streaming service regarding the same media from the same media provider that is experiencing a problem.

In one example, the streaming media SMS gateway may send additional security information to the endpoint device via SMS message(s). For example, if a security violation is suspected, the streaming media SMS gateway may send a new authentication key to the endpoint device via SMS message(s). Alternatively, or in addition, the streaming media SMS gateway may also instruct the endpoint device to switch to a different IP address or a different uniform resource locator (URL) for a media server to provide media of the media streaming session. For instance, the new media server may provide a lower quality version of the media or may provide for additional record keeping regarding the media streaming session. To illustrate, a security violation may be suspected when the endpoint device fails to provide an expected response following the streaming media SMS gateway sending an authentication key to the endpoint device. As a consequence, the streaming media SMS gateway may downgrade the session to a lesser quality media, e.g., by redirecting the endpoint device to a different media server. In another example, a man-in-the-middle attack on the media streaming session may be suspected. The endpoint device may be directed to a different media server by the telecommunications network provider and/or by the media provider sending instructions via SMS message through the streaming media SMS gateway, thereby avoiding the man-in-the-middle. In one example, SMS messages between the endpoint device and the streaming media SMS gateway may also be used to present challenge questions, captchas, or the like to the user, e.g., out-of-band such that a man-in-the-middle is less likely to eavesdrop or manipulate the session. It should be noted that the redirecting of the endpoint device to a different media server may be initiated by the streaming media SMS gateway, or may be initiated by the media provider sending an instruction to the streaming media SMS gateway, e.g., after receiving a notification from the streaming media SMS gateway of a potential security violation. In still another example, if an outage is being experienced by one or more media servers of the media provider, the streaming media SMS gateway may also instruct the endpoint device to use a different IP address or URL for a source of the media. This type of out-of-band communication may therefore be used to maintain continuity of service for media streaming services.

Additional functions of the streaming media SMS gateway may include receiving a usage key from the media provider and sending the usage key to the endpoint device via SMS message. For example, if the user purchases a new movie, video, or service, a usage key may be provided to the endpoint device via SMS. The usage key may be used by the endpoint device to decrypt the media of the session which may be transmitted in an encrypted format via IP packets over the data network. By transmitted the usage key to the endpoint device through the streaming media SMS gateway, it may be less likely or more difficult for an unauthorized third party to intercept the usage key, as compared to if the usage key were sent via the data network. Thus, by deploying a streaming media SMS gateway, a telecommunications service provider network (e.g., including at least a cellular network portion) may provide out-of-band services which are otherwise not available. For instance, rather than just passing IP packets through the telecommunications service provider network, the network may provide additional functions for authentication and security of media streaming services. These and other aspects of the present disclosure are discussed in greater detail below in connection with the examples of FIGS. 1-3.

It should be noted that as referred to herein, the term "session" includes a sequence or flow, comprising one or more packets, segments, datagrams, frames, cells, protocol data units, service data unit, bursts, and so forth, as well as control and management communications related to the establishment, continuity, and termination of the session. The particular terminology or types of data units involved may vary depending upon the underlying network technology. Thus, the term "packet" is intended to refer to various types of data units that may comprise a session or flow. In addition, the terms "configure," and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. It should also be noted that when the present disclosure refers to an SMS message, the same or substantially similar functions may also be provided via multiple SMS messages. Thus, as the term is used herein, an SMS message may comprise one of a series of SMS messages which may be used to convey an authentication key, to convey a calculated response, to convey a usage key, and/or to convey notifications or other types of instructions in accordance with the present disclosure.

To better understand the present disclosure, FIG. 1 illustrates an example network, or system 100 that may implement embodiments of the present disclosure for authenticating an endpoint device associated with a media streaming session. In one example, the system 100 includes a telecommunications service provider network 105. The telecommunications service provider network 105 may comprise a cellular network 110, a service network 140, and an IP Multimedia Subsystem (IMS) network 150. The system 100 may further include other networks 170 connected to the telecommunications service provider network 105. As shown in FIG. 1, the system 100 may connect endpoint device 160 with streaming media SMS gateway (SMSG) 145 in service network 140 and with media servers 179 in networks 170. The system 100 may also connect SMSG 145 with media provider device 175 in networks 170, and/or with other components of telecommunication service provider network 105. The endpoint device 160 may comprise a cellular telephone, a smartphone, a tablet computing device, a laptop computer, a pair of computing glasses, a wireless enabled wristwatch, or any other cellular-capable mobile telephony and computing device (broadly, an "endpoint device"). In one example, endpoint device 160 may communicate with cellular network 110 using multiple cellular communication technologies, such as GSM/time-division multiple access (TDMA) communications, wideband code division multiple access (WCDMA), CDMA2000 communications, orthogonal frequency division multiple access (OFDMA), and the like over various frequency bands.

In one example, the cellular network 110 comprises an access network 120 and a converged network 130, e.g., a cellular core network with components for 2G-4G and beyond architectures. For example, as illustrated in FIG. 1, access network 120 may include UTRAN, eUTRAN, and GSM radio access network (GRAN)/BSS components, while converged network 130 may include evolved packet core (EPC) network components, and network switching subsystem (NSS)/GSM core network and/or General Packet Radio Service (GPRS) core network components. For example, component 121 in access network 120 may comprise a base transceiver station (BTS) and a NodeB, e.g., a base station site with both 2G and 3G components. Component 122 may comprise a BTS, NodeB, and an eNodeB. In other words, component 122 may comprise a base station site with 2G, 3G, and 4G/LTE components. As illustrated in FIG. 1, access network 120 further includes a base station controller (BSC)/radio network controller (RNC) 125, which may perform a variety of wireless network management related tasks such as wireless channel assignments, determining transmission power levels, controlling handovers from one base station to another base station, concentrating multiple signals from endpoint devices for onward transmission to other portions of the access network 120, or converged network 130, and to perform other functions. In the present example, BSC/RNC 125 may coordinate 2G and 3G communications such as GSM/TDMA communications, WCDMA or CDMA2000 communications, and the like via components 121 and 122.

In one example, converged network 130 provides various functions that support wireless services in the 2G-4G/LTE environment. For instance, network devices Mobility Management Entity (MME) 132 and Serving Gateway (SGW) 134 provide various functions for LTE-based communications. For example, MME 132 is the control node for the LTE access networks, such as eUTRAN portions of access network 120 (e.g., eNodeBs). In one embodiment, MME 132 is responsible for user equipment (UE)/endpoint device tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G network portions. For LTE-based communications, converged network 130 may also include a Home Subscriber Server (HSS) 136 that contains subscription-related information (e.g., subscriber profiles), performs authentication and authorization of a wireless service user, and provides information about the subscriber's location. The converged network 130 may also comprise a packet data network (PDN) gateway 138 which serves as a gateway that provides access between the converged network 130 and various data networks, e.g., service network 140, IMS network 150, networks 170, and the like. The packet data network gateway 138 is also referred to as a PDN gateway, a PDN GW or a PGW. In one example, the LTE/EPC portions of converged network 130 may comprise an Internet Protocol (IP)/multi-protocol label switching (MPLS) backbone that supports both real-time and non-real-time service delivery.

As mentioned above, converged network 130 may also include NSS/GSM core network and/or GPRS core network components. For example, converged network 130 may include one or more mobile switching centers (MSCs) for each wireless access network that forms part of the system 100, such as MSC 182 for access network 120. The converged network 130 may further include one or more home location registers (HLRs), such as HLR 186, which functions as a central repository of authentication and service validation information, subscription information, and other information pertaining to user subscriptions and services. Similarly, respective visiting location registers (VLRs) may be integrated within each MSC, and may function as temporary repositories of authentication and service validation information, subscription information, and other information pertaining to visiting user subscriptions and services when an endpoint device is located in a particular geographic region serviced by a particular MSC/VLR. For example, MSC 182 may be designated to serve and administer a first coverage area including access network 120. Thus, MSC 182 may maintain, e.g., in a VLR, user profile records for endpoint devices currently serviced by base stations within the portion of the network that is the responsibility of MSC 182 (e.g., endpoint device 160).

Converged network 130 may also include GPRS network elements for handling data calls to and from endpoint devices. Such network elements may include a serving GPRS support node (SGSN) 184, a gateway GPRS support nodes (GGSN) 188, and related support components including media servers, application servers, and the like. An SGSN refers to a network node responsible for communicating with endpoint devices and routing of data calls. Similar to MSC 182, SGSN 184 may have specific coverage areas and be assigned to handle specific wireless access networks of the system 100. A GGSN refers to a network node responsible for the interworking between a GPRS network (e.g., components of converged network 130 that support GPRS services and functionality) and external packet switched networks, e.g., service network 140, IMS network 150, and networks 170. Thus, FIG. 1 illustrates various connections between GGSN 188 and other components of system 100. In one example, the GPRS portions of converged network 130 may comprise an IP/MPLS.

In one embodiment, converged network 130 also includes a short message service center (SMSC) 180. In one example, SMSC 180 is responsible for receiving SMS messages from and forwarding SMS messages to endpoint devices. For example, SMSC 180 transmits SMS messages to other networks, when a SMS message originates from endpoint device 160 or another endpoint device connected to access network 120, and forwards SMS messages to the endpoint device 160 (or other endpoint device), when a SMS message is sent from elsewhere to the endpoint device 160 (or other endpoint device). If, for example, endpoint device 160 is unavailable to receive a message, the SMSC 180 may store the SMS message until endpoint device 160 becomes available. In one example, SMPP gateway 181 may comprise a routing entity (RE) for delivering data via SMPP between external short message entities (ESMEs) and one or more SMSCs of a cellular network, e.g., over an IP backbone. For instance, SMPP gateway 181 may forward SMS messages received via SMPP from SMSG 145 in service network 140. In one example, the SMSC 180 may reside in a circuit switched portion of converged network 130, e.g., an NSS/GSM core network portion, while SMPP gateway 181 may reside in an IP/packet switched portion of converged network 130 (e.g., in a GPRS core network portion).

In one example, service network 140 may comprise one or more devices for providing services to subscribers, customers, and or users. For example, telecommunications service provider network 105 may provide a cloud storage service, web server hosting, and other services. As such, service network 140 may represent aspects of telecommunications service provider network 105 where infrastructure for supporting such services may be deployed. In the example of FIG. 1, service network 140 may include a server, which may be referred to herein a streaming media SMS gateway (SMSG) 145. In one example, SMSG 145 may comprise a computing system, such as computing system 300 depicted in FIG. 3, specifically configured to perform various steps, functions, and/or operations for authenticating an endpoint device associated with a media streaming session, in accordance with the present disclosure. In one example, service network 140 may also include a database (DB) 146, e.g., a physical storage device integrated with SMSG 145, or attached or coupled to SMSG 145, to store various information regarding media streaming services, users, and/or their endpoint devices. For instance, DB 146 may store seed keys for various endpoint devices and/or for various media streaming services, may store device information regarding endpoint devices of various users that are registered with the media streaming service, may store rules as to when to switch an endpoint device to a different one of media servers 179, may store rules regarding when to allocate and deallocate multiple carriers to a media streaming session of an endpoint device, and so forth.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. Media provider device 175 may comprise a server for managing media streaming services for various users and/or subscribers of a streaming media service. In one example, media provider device 175 may comprise a computing system, such as computing system 300 depicted in FIG. 3, specifically configured to perform various steps, functions, and/or operations for authenticating an endpoint device associated with a media streaming session, in accordance with the present disclosure. Media servers 179 may comprise one or more computing devices for providing media to various endpoint devices via media streaming sessions. For instance, media servers 179 may comprise IP multi-cast servers for providing streaming media to various endpoint devices over access networks which may employ various different types of communication technologies.

In one example, media servers 179 may store complementary or redundant copies of the same media or media content. Thus, any one or more of media servers 179 may be selected as a source to stream a selected media to endpoint device 160. In one example, media provider device 175 may provide a public interface for endpoint devices to access media streaming services, e.g., to login or provide access credentials, to select available media for a media streaming session, to manage settings associated with the media streaming session, such as picture or audio quality, and so forth. In one example, media provider device 175 may select an appropriate one of the media servers 179 as a source of the media for the media streaming session and may notify the media server and the endpoint device 160 to establish the session. As illustrated in FIG. 1, a media streaming session may be established between endpoint device 160 and media provider device 175 via PDN GW 138 and/or GGSN 188 in converged network 130. For instance, endpoint device 160 may receive data services, including media streaming services and other Internet services, via GPRS or LTE IP/packet-based infrastructure of cellular network 110.

As illustrated in FIG. 1, media servers 179 may connect to telecommunications service provider network 105 via IMS network 150, or via PDN GW 138 and/or GGSN 188 in converged network 130. Thus, in one example, a media streaming session from one of media servers 179 to endpoint device 160 may include the media server sending a stream of IP packets to GGSN 188, which may be forwarded to endpoint device 160 via SGSN 184, BSC/RNC 125, and one of components 121 or 122 (e.g., a NodeB portion of component 121 or component 122). In another example, a media streaming session from one of media servers 179 to endpoint device 160 may include the media server sending a stream of IP packets to PDN GW 138, which may be forwarded to endpoint device 160 via SGW 124, and component 122 (e.g., an eNodeB portion of component 122).

As further illustrated in FIG. 1, media provider device 175 may communicate with SMSG 145 in service network 140. For instance, media provider device 175 may establish media streaming sessions from media severs 179 to endpoint devices in the cellular network 110, such as endpoint device 160, monitor the media streaming sessions, request authentication of endpoint devices in connection with the streaming media sessions, and otherwise utilize SMSG 145 to send instructions to, and to receive responses and other information from the endpoint devices.

In one example, SMSG 145 may include or comprise an IP short message service center (IP-SMSC). An IP-SMSC may provide for session initiation protocol (SIP)-based and/or SMPP-based forwarding of SMS messages for endpoint devices with data connections (e.g., those serviced by UTRAN or eUTRAN access network infrastructure and IP/packet-based core network infrastructure). Thus, as illustrated in FIG. 1 SMSG 145 may interface with PDN GW 138, GGSN 188, and/or IMS network 150 to send and receive SMS messages of endpoint device 160 using SIP or SMPP. In one example, an IP-SMSC may also communicate with SMPP gateway 181 via SMPP. For instance, SMSG 145 may function as an external short message entity (ESME) that may communicate with SMPP gateway 181 via SMPP. In one example, the SMPP gateway 181 may translate SMS messages received via SMPP for transmission to SMSC 180 via SS7, and may translate SMS messages received from SMSC 180 via SS7 into SMPP format for transmission to SMSG 145. In another example, SMPP gateway 181 may function as a routing entity (RE) and simply convey SMS messages to SMSC 180 via SMPP, while the SMSC 180 translates the SMS message into SS7 format for delivery to endpoint device 160 via MSC 182 and BSC/RNC 125.

In one example, SMS messages may be forwarded to and received from endpoint devices using SMS over SIP or SMS over SMPP via an IP/packet-based infrastructure as a preferred method of delivery, while SMS via SS7 over NSS/GSM core network components may be used if data network connections are not available. For example, SMSG 145 may comprise a master short message service center that is used for primary management of SMS messages in the telecommunications service provider network 105, while SMSC 180 may be used for endpoint devices that do not have data connections via UTRAN/GPRS or eUTRAN/LTE infrastructure. However, it should be noted that SIP-based links from SMSG 145 to GPRS and/or EPC components of converged network 130 may not be used in connection with examples of authenticating an endpoint device associated with a media streaming session, in accordance with the present disclosure. Rather, SMSG 145 may send SMS messages to and receive SMS messages from endpoint device 160 via 2G components, e.g., SMPP gateway 181, SMSC 180, MSC 182, and/or BSC/RNC 125 for purposes of authenticating an endpoint device associated with a media streaming session, in accordance with the present disclosure.

It should be noted that the system 100 has been simplified. In other words, the system 100 may be implemented in a different form than that which is illustrated in FIG. 1. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, converged network 130, and IMS network 150 are omitted for clarity, including gateways or border elements providing connectivity between such networks, internal routers within EPC network 130, and so on. Similarly, due to the relatively large number of connections available between devices in the system 100, various links between MME 132, SGW 134, components 121 and 122, SMSC 180, PDN GW 138, SMSG 145, and other components of system 100 are also omitted for clarity.

In addition, although aspects of the present disclosure have been discussed above in the context of a converged network with GSM/TDMA-based, GPRS/CDMA-based, and LTE/OFDMA-based components, examples of the present disclosure are not so limited. For example, the teachings of the present disclosure can be applied to networks and systems that use other types of wireless/cellular technologies, such as enhanced data rates for GSM evolution (EDGE), IS-95, or a future technology or standard-based network, e.g., a 5G network, and so forth. Similarly, although the SMSG 145 and DB 146 are illustrated as components of service network 140, and SMSC 180 is illustrated as a component within converged network 130, in other examples, any one or more of these components may be deployed in a different configuration. For example, SMSG 145 may be deployed within IMS network 150, or within converged network 130. In another example, SMSC 180 and SMPP gateway 181 may be combined into a single component within converged network 130, within IMS network 150, or in service network 140. In still another example, SMSG 145 may communicate directly with SMSC 180 (e.g., without intervening SMPP gateway 181) using SMS messages encapsulated via SMPP or SIP. For instance, SMSC 180 may comprise or include an IP-SMSC. Thus, these and other modifications are all contemplated within the scope of the present disclosure.

Figure 2:
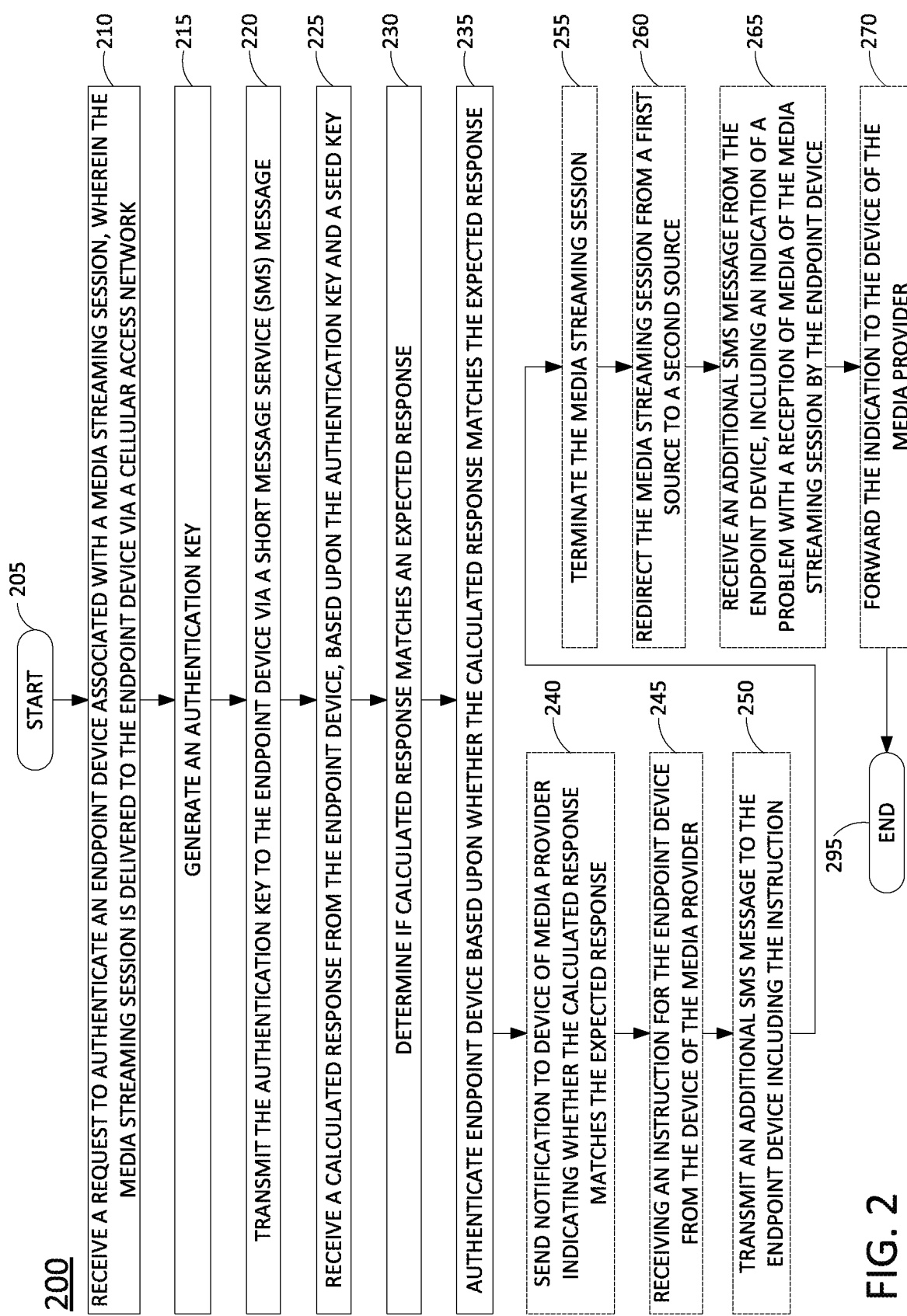
FIG. 2 illustrates a flowchart of an example method for authenticating an endpoint device associated with a media streaming session.

FIG. 2 illustrates a flowchart of an example method 200 for authenticating an endpoint device associated with a media streaming session, in accordance with the present disclosure. In one example, steps, functions and/or operations of the method 200 may be performed by a network-based device, such as SMSG 145, or SMSG 145 in conjunction with other components of the system 100, such as SMSC 180. In one example, the steps, functions, or operations of method 200 may be performed by a computing device or system 300, and/or processor 302 as described in connection with FIG. 3 below. For instance, computing device or system 300 may represent a SMSC of the present disclosure. For illustrative purposes, the method 200 is described in greater detail below in connection with an example performed by a processor, such as processor 302. The method begins in step 205 and proceeds to step 210.

At step 210, the processor receives a request to authenticate an endpoint device associated with a media streaming session. For example, the media streaming session may be delivered to the endpoint device from a media server of media streaming service via a cellular access network (and via cellular core network infrastructure). In one example, the cellular access network for carrying the media streaming session may comprise a UTRAN (3G) or an eUTRAN (4G). In one example, the request to authenticate the endpoint device is received from a device of the media provider, e.g., from the media server or from another device associated with the media provider. In one example, the request may include various parameters relating to the endpoint device, such as a telephone number associated with the endpoint device, a username or user identifier, a seed key associated with the endpoint device, and so on.

At step 215, the processor generates an authentication key. For instance, the processor may generate a random number, string or other sequence of bits or characters for use as an authentication key for authenticating the endpoint device.

At step 220, the processor transmits the authentication key to the endpoint device via a short message service (SMS) message. In one example, the authentication key and/or the entire SMS message may be encrypted, e.g., using AES or a similar encryption format. In one example, the transmitting comprises forwarding the key to a short message service center (SMSC) in accordance with a SMPP format or in accordance with a SIP format. In one example, the SMS message may be sent to a SMPP gateway/routing entity that may forward the SMS message to the SMSC. In one example, the SMS message may be forwarded to the endpoint device via a BSS. For instance, the SMS message may be forwarded over NSS/GSM core network components of the cellular network via SS7, with final delivery via a BSS/GRAN access network. For instance, the SMS message may be transmitted to the endpoint device via a base transceiver station (BTS). In other words, the SMS message may be delivered via a different path that is out-of-band with respect to the media streaming session. In one example, the SMS message is transmitted to the endpoint device via a dedicated control channel (DCCH). For instance, according to GSM TDMA protocols, SMS messages may be sent via a DCCH that is separate from traffic channels that are used for voice calls (and which is also separate from data channels that are used for CDMA and OFDMA communications of UTRAN and eUTRAN-based components).

At step 225, the processor receives a calculated response from the endpoint device based upon the authentication key and a seed key of the endpoint device. In one example, the seed key is provided to the endpoint device when the endpoint device is registered with the media provider. Accordingly, the endpoint device may generate the calculated response based upon the seed key and based upon the authentication key, where the generating may be in accordance with any algorithm or set of operations that is known to both the endpoint device and the processor. In one example, the endpoint device may receive the SMS message, determine that the SMS message includes an authentication key, and generate the calculated response in a manner that is transparent to a user of the endpoint device. In other words, the receiving of the SMS message, the generating of the calculated response, and the transmission of the calculated response via a return SMS message is not dependent upon any user input. For example, no sound may be presented, no indication may be presented on a display screen of the endpoint device that a SMS message has arrived, no SMS message may sit in an SMS message inbox of the endpoint device, etc.

At step 230, the processor determines whether the calculated response matches an expected response based upon the authentication key and the seed key. For instance, the media provider may provide a copy of the seed key in advance, or in conjunction with or as part of the authentication request. In addition, the processor may generate the expected response using the same algorithm or set of operations as the endpoint device such that the expected response and the calculated response received from the endpoint device should match if the endpoint device is properly registered, properly authorized to receive the media streaming session, etc.

At step 235, the processor authenticates the endpoint device based upon whether the calculated response matches the expected response. For instance, if the calculated response matches the expected response, the processor may confirm that the endpoint device is authorized, that the endpoint device is the device that is expected to receive the media streaming session, and so forth. However, if the response does not match the expected response, then the endpoint device may fail the authentication. Any number of factors may cause the endpoint device to fail the authentication, such as a user attempting to use an unregistered device for the media streaming session (e.g., the user has recently purchased a new mobile device that has not yet been registered with the media provider, the user attempting to utilize a friend's mobile device, someone stealing the user's login and password for the media streaming service and attempting to use the credentials from an unauthorized device, etc.)

At optional step 240, the processor may send a notification to a device of the media provider indicating whether the calculated response matches the expected response. In one example, the device of the media provider may comprise the media server. In another example, the device of the media provider may comprise a separate device associated with the media provider for managing media streaming sessions.

At optional step 245, the processor may receive an instruction for the endpoint device from the device of the media provider. For instance, the instruction may direct the endpoint device to transfer from a first source (e.g., a first media server) to a second source (e.g., a second media server) to receive media of the media streaming session. In other words, the media streaming session may be redirected from the first source to the second source. In one example, the instruction is sent in response to the notification that is sent to the device of the media provider at optional step 240. In one example, the media streaming session may be upgraded to a higher quality when the calculated response matches the expected response by instructing the endpoint device to transfer to the second source. For instance, as compared to the first source, the second source may provide a higher resolution video, a higher bit rate audio, or the like. However, in another example, the media streaming session may downgraded to a lesser quality when the calculated response does not match the expected response by instructing the endpoint device to transfer to the second source. For instance, an endpoint device that is unauthenticated but which may present a valid login and password may still be permitted to receive the media, but may be denied access to a higher quality version of the media unless access is attempted from a device that passes the authentication. In still another example, the instruction is sent to the processor by the media provider when the media provider determines a problem associated with the delivery of the media of the media streaming session by the media provider.

At optional step 250, the processor may transmit an additional SMS message to the endpoint device, the additional SMS message including the instruction. In one example, the instruction directs the endpoint device to transfer from a first source to a second source to receive the media of the media streaming session. As mentioned above, the redirecting may be to upgrade or downgrade a quality of the media of the media streaming session. Alternatively, or in addition, the redirecting to a second source (e.g., a second media server) may be to avoid a network problem between a first source/first media server of the media provider and the cellular network, such a network congestion causing jitter or packet loss, a suspected man-in-the-middle attacker or eavesdropper, and so forth.

At optional step 255, the processor may terminate the media streaming session when the calculated response does not match the expected response. In one example, the terminating can be instigated by the processor, e.g., based upon instructions previously supplied by the media provider, or can be initiated by the media provider after receiving the notification at step 235. For instance, the media provider may transmit an instruction to the processor to terminate the media streaming session. In one example, the operations of optional step 255 may be a consequence of the instruction that is transmitted at optional step 250. In one example, the media provider may simply stop transmitting the media from the media server. However, as an alternative, or in addition, the processor may direct infrastructure of the cellular network to also drop the media streaming session. For instance, dedicated bearers of the media streaming session may be deallocated and/or assigned to another session for another endpoint device.

At optional step 260, the processor may redirect the media streaming session from a first source to a second source, e.g., to either upgrade or downgrade the quality of the media, to avoid a problem in the media streaming session that is detected, such as a broken connection, a suspected man-in-the-middle attack, a failed authentication at step 235, and so forth. In one example, optional step 260 may be performed by the processor without further instruction from the media provider. In another example, the operations of optional step 260 may be a consequence of the instruction that is transmitted at optional step 250.

At optional step 265, the processor may receive an additional SMS message from the endpoint device. For example, the additional SMS message may include an indication of a problem with a reception of media of the media streaming session by the endpoint device. For instance, a data network portion of a cellular network may be overloaded such that sessions may be blocked, dropped, degraded in quality, etc. In one example, the data network portion may be in a condition where the endpoint device and the source/media server of the media streaming session cannot communicate. However, since SMS messages may be sent via a dedicated control channel (DCCH), the endpoint device may send a notification to the media provider using an SMS message (e.g., via GSM/TDMA components, such as a BTS, BSS/GRAN, etc.) which may have a greater likelihood of reaching the media provider.

At optional step 270, the processor may forward the indication contained in the additional SMS message received at optional step 265 to the device of the media provider. Following step 235 or any of optional steps 240-270, the method 200 may proceed to step 295 where the method 200 ends.

It should be noted that the method 200 may be expanded to include additional steps, may be modified to perform different steps, or may omit certain steps. For instance, in one example the processor may downgrade a media streaming session rather than terminate the session at step 255. For instance, if the session utilizes multiple carriers in a carrier aggregation scheme, one or more of the carriers may be deallocated from the media streaming session and/or reassigned to sessions of other endpoint devices. However, in another example, the processor may upgrade the media streaming session, e.g., by adding additional carriers to the session when the response matches the expected response at step 235. In another example, the media may be downgraded to a lesser quality or the media streaming session may be terminated following the forwarding of the indication to the device of the media provider at optional step 270. For instance, a lower resolution video or a lower bit rate streaming audio may be more likely to be received without jitter, packet loss (e.g., causing gaps in the media), or similar problems. Although the downgrading or the termination of the media streaming session may be instigated by the processor or by the media provider, in one example it is contemplated that such additional operations may be initiated by an instruction from the media provider to the processor, since the cellular network may be able to detect problems of the media of the media streaming session without the endpoint device sending an SMS message. In another example, the method 200 may include the processor sending additional security information to the endpoint device via SMS message(s). For instance, SMS messages via DCCH may also be used to present challenge questions, captchas, or the like to the user, e.g., out-of-band such that a man-in-the-middle is less likely to eavesdrop or manipulate the session. In still another example, the method 200 may include the processor receiving a usage key from the media provider and sending the usage key to the endpoint device using an SMS message via a DCCH. For example, if the user purchases a new movie, video, or service, a usage key may be provided to the endpoint device via SMS. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Figure 3:
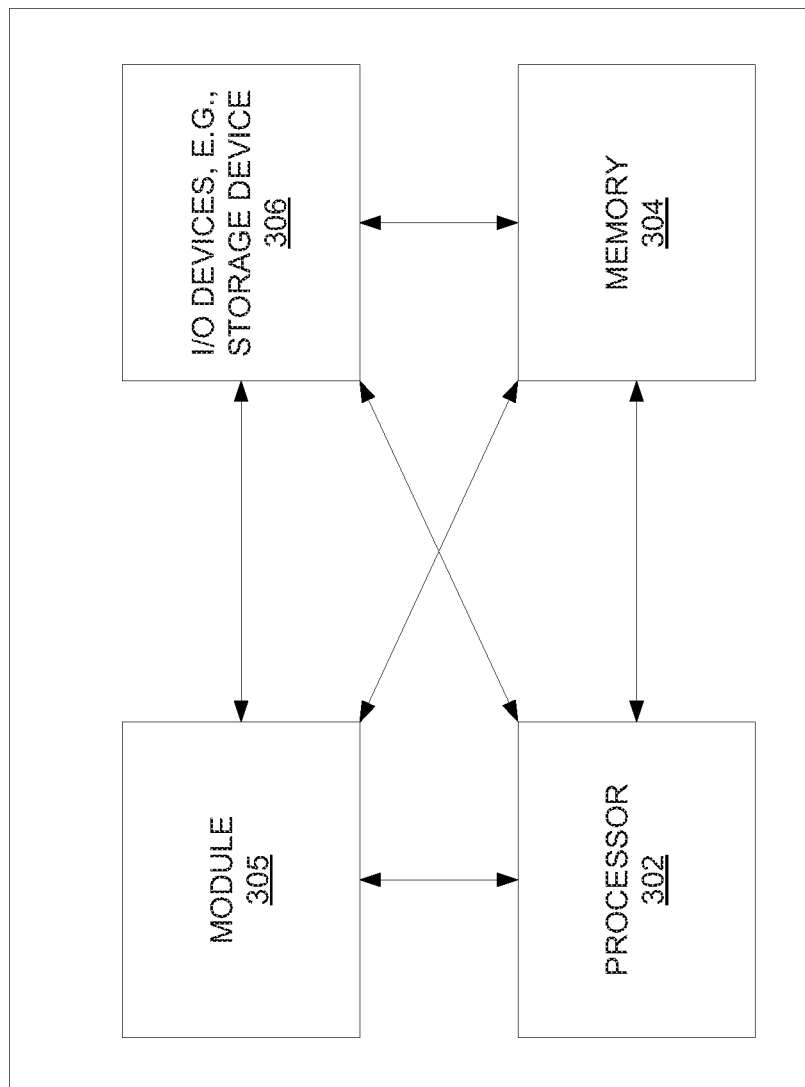
FIG. 3 illustrates an example high-level block diagram of a computer specifically programmed to perform the steps, functions, blocks, and/or operations described herein.

FIG. 3 depicts a high-level block diagram of a computing device specifically programmed to perform the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for authenticating an endpoint device associated with a media streaming session, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for authenticating an endpoint device associated with a media streaming session (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for authenticating an endpoint device associated with a media streaming session (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. An endpoint device comprising:
   a processor; and
   a computer-readable medium storing instructions which, when executed by the processor, cause the processor to perform operations, the operations comprising:
      sending a request to a server of a communication network to authenticate the endpoint device associated with a media streaming session, wherein the media streaming session is via a cellular access network, wherein the media streaming session is between a media server of a media provider and the endpoint device, wherein the request to authenticate the endpoint device is sent to the server via a device of the media provider;
      receiving an authentication key via a short message service message; and
      sending a calculated response, the calculated response based upon the authentication key and a seed key stored at the endpoint device, wherein a notification is received by the device of the media provider indicating whether the calculated response matches an expected response.

2. The endpoint device of claim 1, wherein the short message service message is received via a base transceiver station.

3. The endpoint device of claim 1, wherein the short message service message is received via a dedicated control channel.

4. The endpoint device of claim 1, wherein the short message service message is received via a short message service center.

5. The endpoint device of claim 4, wherein the authentication key is received by the short message service center in accordance with a short message service peering protocol format.

6. The endpoint device of claim 1, wherein the cellular access network comprises a uniform terrestrial radio access network or an evolved uniform terrestrial radio access network, and wherein the short message service message is received via a base station subsystem.

7. The endpoint device of claim 1, wherein a media of the media streaming session is upgraded to a higher quality when the calculated response matches the expected response.

8. The endpoint device of claim 1, wherein a media of the media streaming session is downgraded to a lesser quality when the calculated response does not match the expected response.

9. The endpoint device of claim 1, wherein the operations further comprise:
   receiving an additional short message service message by the endpoint device, the additional short message service message including an instruction from the device of the media provider, wherein the instruction directs the endpoint device to transfer from a first source to a second source to receive a media content of the media streaming session.

10. The endpoint device of claim 9, wherein the instruction is received in response to the notification that is received by the device of the media provider.

11. The endpoint device of claim 9, wherein the instruction is received in response to the media provider determining a problem associated with a delivery of the media content by the media provider.

12. The endpoint device of claim 1, wherein the seed key is received by the endpoint device when the endpoint device is registered with the media provider.

13. The endpoint device of claim 1, wherein the operations further comprise:
sending an additional short message service message from the endpoint device, the additional short message service message including an indication of a problem with a reception of a media content of the media streaming session by the endpoint device, where the indication is to be forwarded to the device of the media provider.

14. The endpoint device of claim 13, wherein the media content is downgraded to a lesser quality or the media streaming session is terminated following the forwarding of the indication to the device of the media provider.

15. A non-transitory computer-readable medium storing instructions which, when executed by a processor of an endpoint device, cause the processor to perform operations, the operations comprising:
sending a request to a server of a communication network to authenticate the endpoint device associated with a media streaming session, wherein the media streaming session is via a cellular access network, wherein the media streaming session is between a media server of a media provider and the endpoint device, wherein the request to authenticate the endpoint device is sent to the server via a device of the media provider;
receiving an authentication key via a short message service message; and
sending a calculated response, the calculated response based upon the authentication key and a seed key stored at the endpoint device, wherein a notification is received by the device of the media provider indicating whether the calculated response matches an expected response.

16. The non-transitory computer-readable medium of claim 15, wherein the short message service message is received via a base transceiver station, a dedicated control channel, or a short message service center.

17. The non-transitory computer-readable medium of claim 15, wherein the cellular access network comprises a uniform terrestrial radio access network or an evolved uniform terrestrial radio access network, and wherein the short message service message is received via a base station subsystem.

18. A method comprising:
sending, by a processor of an endpoint device, a request to a server of a communication network to authenticate the endpoint device associated with a media streaming session, wherein the media streaming session is via a cellular access network, wherein the media streaming session is between a media server of a media provider and the endpoint device, wherein the request to authenticate the endpoint device is sent to the server via a device of the media provider;
receiving, by the processor, an authentication key via a short message service message; and
sending, by the processor, a calculated response, the calculated response based upon the authentication key and a seed key stored at the endpoint device, wherein a notification is received by the device of the media provider indicating whether the calculated response matches an expected response.

19. The method of claim 18, wherein a media of the media streaming session is upgraded to a higher quality when the calculated response matches the expected response.

20. The method of claim 18, wherein a media of the media streaming session is downgraded to a lesser quality when the calculated response does not match the expected response.

* * * * *